(12) United States Patent
Tuchtenhagen

(10) Patent No.: US 7,149,006 B2
(45) Date of Patent: Dec. 12, 2006

(54) SCANNER LID WHITE BOARD

(75) Inventor: Brian Tuchtenhagen, Boise, ID (US)

(73) Assignee: Hewltt-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/251,032

(22) Filed: Sep. 20, 2002

(65) Prior Publication Data
US 2004/0057084 A1 Mar. 25, 2004

(51) Int. Cl.
H04N 1/04 (2006.01)

(52) U.S. Cl. ........................................ 358/474; 358/497

(58) Field of Classification Search ................ 358/474, 358/497, 494, 471, 473, 472, 505, 501, 401; 382/312, 321, 313; 250/234–236, 239, 216; 399/211, 212, 379, 380
See application file for complete search history.

(56) References Cited
U.S. PATENT DOCUMENTS 3,713,861 A    1/1973  Sharp ............................ 427/7
3,788,737 A    1/1974  Kidd ........................... 399/189
4,415,261 A   11/1983  Yukawa et al. ................. 355/75
5,382,998 A    1/1995  Shida et al. .................... 355/50
5,548,417 A *  8/1996  Sekimoto et al. ............. 358/474
6,009,240 A * 12/1999  Eguchi et al. ............... 358/1.16
6,081,629 A *  6/2000  Browning ..................... 382/313
6,088,025 A *  7/2000  Akamine et al. ............. 345/175
6,122,481 A    9/2000  Rusnack ....................... 399/380
6,163,668 A   12/2000  Rakahashi et al. ........... 399/144
6,351,624 B1   2/2002  Hiruta ......................... 399/380
6,809,843 B1* 10/2004  Youngers ..................... 358/474
6,952,285 B1* 10/2005  Naka ........................... 358/1.9
6,980,331 B1* 12/2005  Mooney et al. .............. 358/400

FOREIGN PATENT DOCUMENTS

JP       2000261601 A   *  9/2000

* cited by examiner

Primary Examiner—Cheukfan Lee

(57) ABSTRACT

This invention relates to scanner lids that can be removed from the scanner and utilized as a white board. After the desired markings have been placed upon the lid/white board, the lid/white board is placed back upon the scanner and the desired markings are scanned by the scanner. Once the desired markings have been scanned, an image of the desired markings can be forwarded to another media handling device.

18 Claims, 3 Drawing Sheets

SCANNER LID WHITE BOARD

BACKGROUND OF THE INVENTION

1. Field of the Invention

This invention relates to a scanner lid that is removed from the scanner and utilized as a white board. After the desired markings have been placed upon the lid/white board, the lid/white board is placed back upon the scanner and the desired markings are scanned by the scanner. Once the desired markings have been scanned, an image of the desired markings is forwarded to another media handling device.

2. Description of the Related Art

Prior to the present invention, as forth in general terms above and more specifically below, it is known, in the document reproduction art, to employ document reproduction devices having a variety of lid constructions. Exemplary of such prior art are U.S. Pat. No. 4,415,261 ('261) to K. Yukawa et al., entitled "An Improved Platen Cover for a Copying Machine," commonly assigned U.S. Pat. No. 6,122,481 ('481) to M. R. Rusnack, entitled "Image Reproduction Device Flexible Cover for Image Capture of Three-Dimensional Objects," U.S. Pat. No. 6,163,668 ('668) to M. Takahashi et al., entitled "Multi-Functional Copier and Printing Apparatus Which Provides Various Options From Which to Read In, Output and Display Images," and U.S. Pat. No. 6,351,624 ('624) to K. Hiruta, entitled "Document Hold-Down Device and Method for Holding Down Document." While the '261, '481, '668, and '624 references disclose a variety of lid constructions, none of these references teach the use of a removable/replaceable lid and/or a lid that can be used as a white board. Consequently, a more advantageous system, then, would be provided if the lid could be easily removed/replaced and subsequently used as a white board.

It is also known, in the media presentation art, to employ whiteboards. In typical fashion, a white board is utilized in a similar fashion as a chalkboard. Special marking pens are used to place markings upon the white board. The white board can then be easily erased. An additional feature of the white board allows for the markings placed upon the white board to be printed on to a sheet of paper for archival purposes.

A further additional feature of the white board allows for the markings placed upon the white board to be interacted upon by the participants at the presentation. In this manner, the participants at the presentation can use of their mobile devices, such as a personal digital assistant (PDA) to interact with the white board and potentially alter the original markings on the white board. While the white board technology described above has met with a modicum of success, the white board is not removable, replaceable or portable and the markings on the white board cannot be scanned and forwarded to another media handling device. Therefore, a further advantageous system, then, would be provided if the white board was removable, replaceable, and portable and allowed the markings on the white board to be scanned and forwarded to another media handling device.

It is apparent from the above that there exists a need in the art for scanner lid that is removable, replaceable, and portable and is capable of functioning as a white board, but which at the same time can be scanned so that the markings can be forwarded to another media handling device. It is a purpose of this invention to fulfill this and other needs in the art in a manner more apparent to the skilled artisan once given the following disclosure.

SUMMARY OF THE INVENTION

Generally speaking, this invention fulfills these needs by providing a removable/replaceable scanner lid white board, wherein the white board is comprised of: a scanner means; and a lid means removably connected to the scanner means, wherein the lid means includes a white board side such that markings can placed upon the white board side and the white board side can be subsequently placed upon the scanner means such that the markings can be scanned for subsequent manipulation of the markings.

In certain preferred embodiments, the white board lid further includes a corner section reserved for writing In the e-mail address, the Internet protocol (IP) address, file location or other such a similar address of a media-handling device to which the scanned Image placed upon the white board is to be forwarded. The scanner employs a conventional optical characteristic recognition (OCR) system to recognize the address and assist In forwarding the scanned image to the desired media-handling device. The markings are subsequently manipulated by scanning the markings through the use of the scanner and an image of the markings are forwarded to another media-handling device.

In another further preferred embodiment, the present invention utilizes a removable, portable white board as the backing for the scanner lid of a scanner. The user can remove the scanner lid and use it as a sketch pad. When the user has completed a sketch, the user can replace the lid on the scanner and send the sketch to another media-handling device via the scanner.

The preferred white board, according to this invention, offers the following advantages: lightness in weight; ease of assembly and repair; good durability; excellent economy; improved recyclability of materials; reduced paper consumption; and reusability. In fact, in many of the preferred embodiments, these factors of lightness in weight, ease of assembly and repair, durability, economy, improved recyclability of materials, reduced paper consumption, and reusability are optimized to an extent that is considerably higher than heretofore achieved in prior, known whiteboards.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
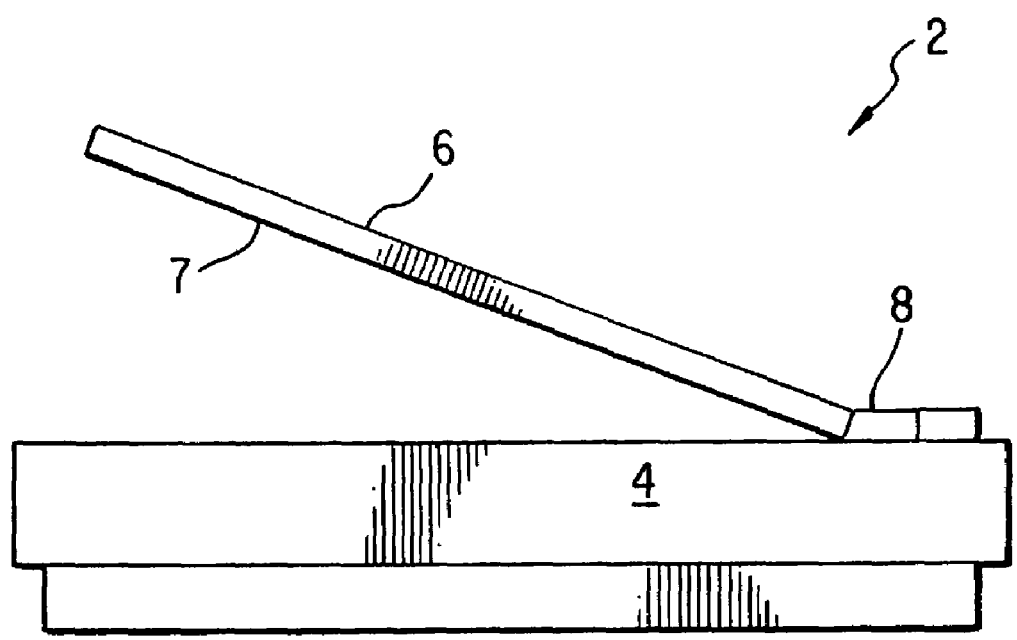
FIG. 1 is a side, plan view of a scanner having a removable white board lid, according to one embodiment of the present invention.

With reference first to FIG. 1, there is illustrated one preferred embodiment for use of the concepts of this invention. FIG. 1 shows scanner 2 having removable/replaceable white board lid 6. Scanner 2 includes, in part, conventional scanner base 4, removable/replaceable white board lid 6, white board lid coating 7, and lid hinge 8.

With respect to white board lid 6, lid 6 is removably connected to conventional scanner base 4 through the use of a variety of conventional connection devices. White board lid coating 7, preferably, is any suitable coating that is placed upon white board lid 6 which allows markings to be easily placed upon white board lid coating 7. Also, white board lid coating 7, preferably, allows the markings placed upon white board lid 6 to be easily erased. Also, white board lid coating 7, preferably, allows the markings placed upon white board lid 6 to be easily scanned by conventional scanner base 4. Finally, white board lid coating 7, preferably, should be constructed of any suitable material that will not scratch, mar or otherwise adversely affect the optical characteristics of conventional scanner base 4. Lid hinge 8, preferably, is constructed to allow the user to write upon white board lid 6 without having to remove the white board lid 6 from conventional scanner base 4 if the user decides to not remove white board lid 6 from conventional scanner base 4.

Figure 2:
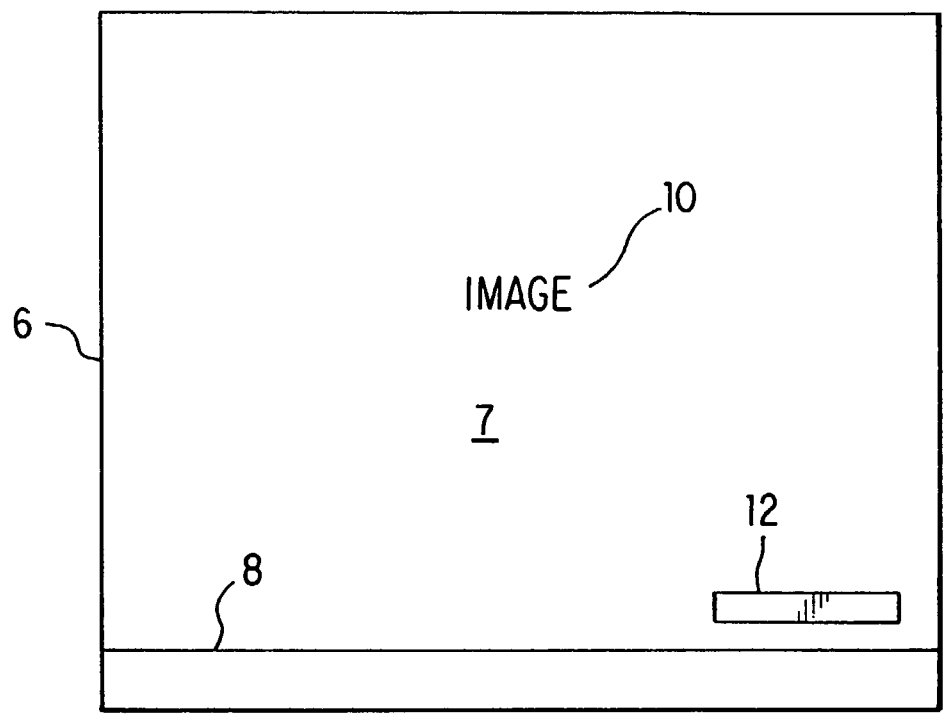
FIG. 2 is a front view of the removable white board lid after it has been removed from the scanner.
Figure 4:
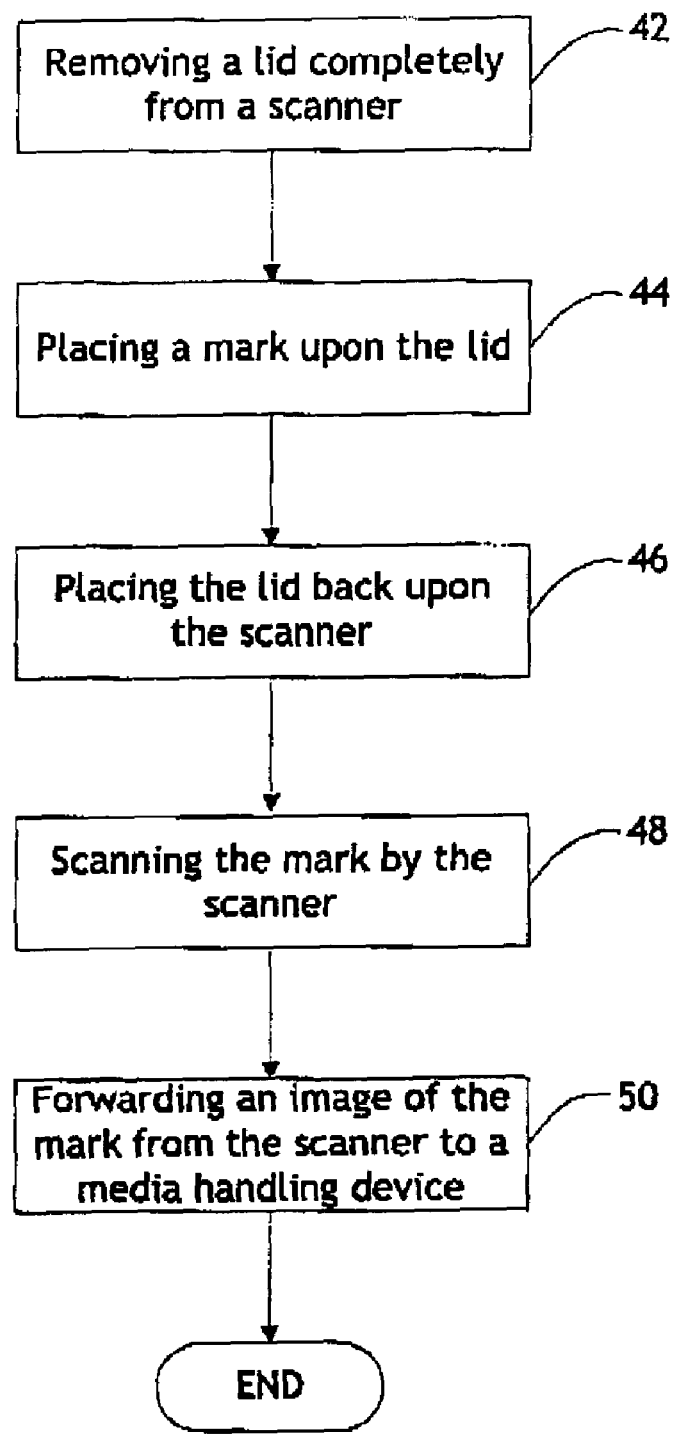
FIG. 4 is a flow chart showing the method of the present invention.

As shown in FIGS. 2 and 4, white board lid 6 has been removed from conventional scanner base 4 (step 42, FIG. 4). In this manner, white board lid 6 can be conventionally attached to a solid surface such as a wall or a desktop in order to place image 10 upon white board lid 6 (step 44). A location box 12 is located, preferably, in a corner of white board lid 6. Location box 12 can be used for writing the e-mail address, the Internet protocol (IP) address, file location or other such a similar address of the media-handling device 14 to which the scanned image placed upon the white board is to be forwarded. The scanner would employ a conventional optical characteristic recognition (OCR) system to recognize the address and assist in forwarding the scanned image to the desired media-handling device.

Figure 3:
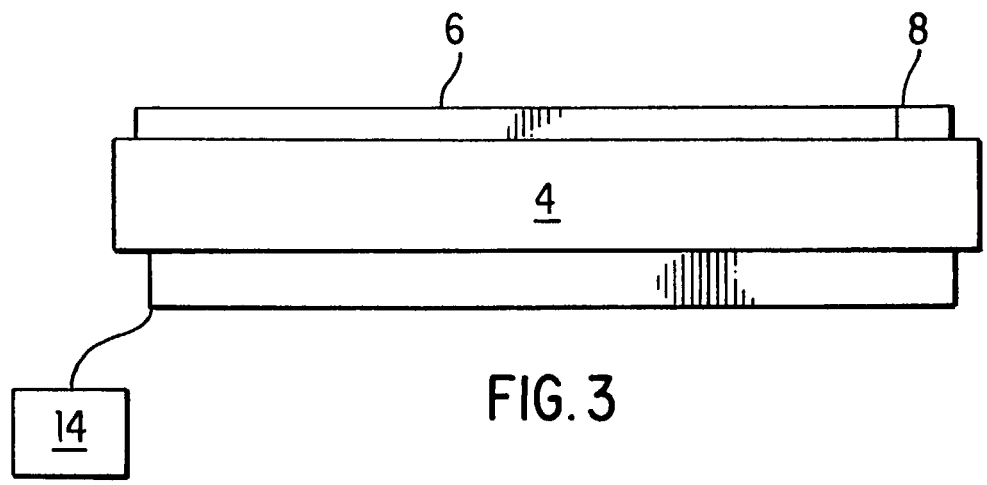
FIG. 3 is a side, plan view of the scanner with the removable lid being placed back upon the scanner.

FIGS. 3 and 4 illustrate white board lid 6 being placed back upon conventional scanner base 4 (step 46, FIG. 4.). In this manner, the image 10 can be subsequently manipulated by scanning image 10 through the use of conventional scanner base 4 and a copy of image 10 can be forwarded to another media handling device 14 (step 48 and 50). It is to be understood that conventional scanner base 4 can Interact with media-handling device 14 through a variety of techniques such as a direct hardwire and/or a wireless connection between scanner base 4 and media-handling device 14.

Once given the above disclosure, many other features, modifications or improvements will become apparent to the skilled artisan. Such features, modifications or improvements are, therefore, considered to be a part of this invention, the scope of which is to be determined by the following claims.

What is claim is:

1. A removable/replaceable white board lid scanner, comprising:
   a scanner means; and
   a lid means completely detachable from said scanner means, wherein said lid means includes a white board side such that markings are placed upon said white board side and said white board side is subsequently placed back upon said scanner means such that said markings are scanned for subsequent manipulation of said markings.

2. The scanner, as in claim 1, wherein said scanner means is operatively connected to a media-handling device.

3. The scanner, as in claim 1, wherein said lid means is further comprised of:
   a hinge means.

4. The scanner, as in claim 1, wherein said lid means is further comprised of:
   a white board coating such that said markings are placed upon said white board coating.

5. The scanner, as in claim 1, wherein said lid means is further comprised of:
   a location box means located substantially upon said lid means for use in determining a location for forwarding the scanned markings.

6. A method for forwarding an image from a scanner means to a media-handling device, comprising the steps of:
   removing a lid means completely from a scanner means;
   placing a mark upon said lid means;
   placing said removable lid means back upon said scanner means;
   scanning said mark by said scanner means; and
   forwarding an image of said mark from said scanner means to a media handling device.

7. The method, as in claim 6, wherein said method is further comprised of the step of:
   inserting an address of said media handling device on said lid means.

8. The method, as in claim 7, wherein said inserting step is further comprised of the step of:
   scanning said address to determine a location of said media-handling device.

9. A white board lid scanner, comprising:
   a scanner means; and
   a detachable/replaceable lid means completely detachable from said scanner means, wherein said lid means includes a white board side such that markings are placed upon said white board side and said white board side is subsequently placed back upon said scanner means such that said markings are scanned for subsequent manipulation of said markings.

10. The scanner, as in claim 9, wherein said scanner means is operatively connected to a media-handling device.

11. The scanner, as in claim 9, wherein said lid means is further comprised of:
    a hinge means.

12. The scanner, as in claim 9, wherein said lid means is further comprised of:
    a white board coating such that said markings are placed upon said white board coating.

13. The lid scanner, as in claim 9, wherein said lid means is further comprised of:
    a location box means located substantially upon said lid means for use in determining a location for forwarding the scanned markings.

14. A white board lid scanner means, comprising:
    a means for scanning; and
    a detachable/replaceable lid means completely detachable from said scanner means, wherein said lid means includes a white board side such that markings are placed upon said white board side and said white board side is subsequently placed back upon said scanner means such that said markings are scanned for subsequent manipulation of said markings.

15. The scanner means, as in claim 14, wherein said means for scanning is operatively connected to a media-handling device.

16. The scanner means, as in claim 14, wherein said lid means is further comprised of:
    a hinge means.

17. The scanner means, as in claim 14, wherein said lid means is further comprised of:
    a means for coating said white board such that said markings are placed upon said white board coating.

18. The scanner means, as in claim 14, wherein said lid means is further comprised of:
    a location box means located substantially upon said lid means for use in determining a location for forwarding the scanned markings.

* * * * *

UNITED STATES PATENT AND TRADEMARK OFFICE
CERTIFICATE OF CORRECTION

PATENT NO. : 7,149,006 B2
APPLICATION NO. : 10/251032
DATED : December 12, 2006
INVENTOR(S) : Brian Tuchtenhagen It is certified that error appears in the above-identified patent and that said Letters Patent is hereby corrected as shown below:

On the title page, item (73), in "Assignee", in column 1, line 1, delete "Hewltt" and insert -- Hewlett --, therefor.

In column 4, line 38, in Claim 13, after "The" delete "lid".

Signed and Sealed this

Twenty-eighth Day of April, 2009

JOHN DOLL
*Acting Director of the United States Patent and Trademark Office*